O. SODERSTROM AND W. FUHRMANN.
BUTTON MACHINE.
APPLICATION FILED MAY 1, 1918.
1,433,244.
Patented Oct. 24, 1922.
6 SHEETS—SHEET 1.
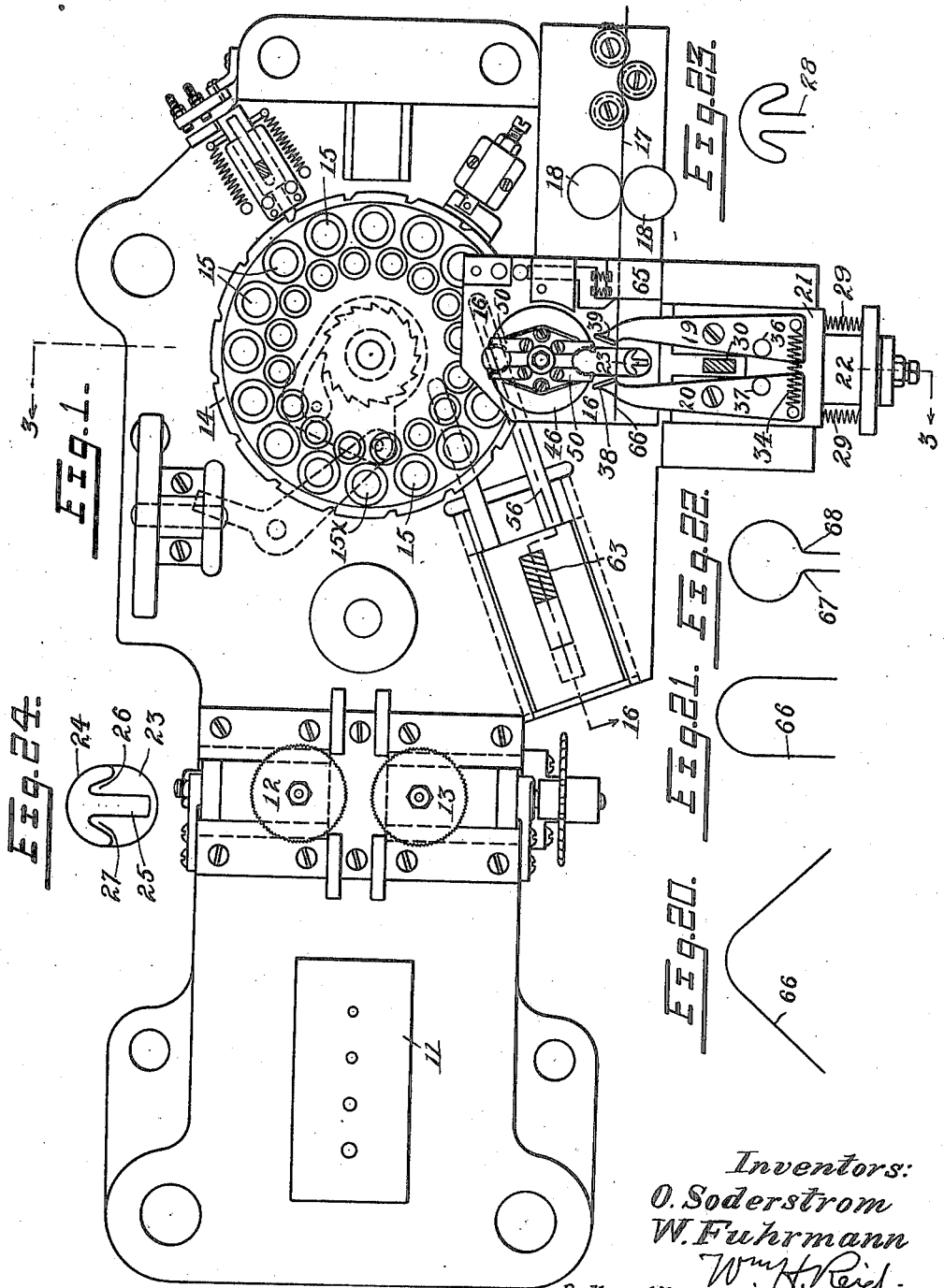
Inventors:
O. Soderstrom
W. Fuhrmann
By their Attorney

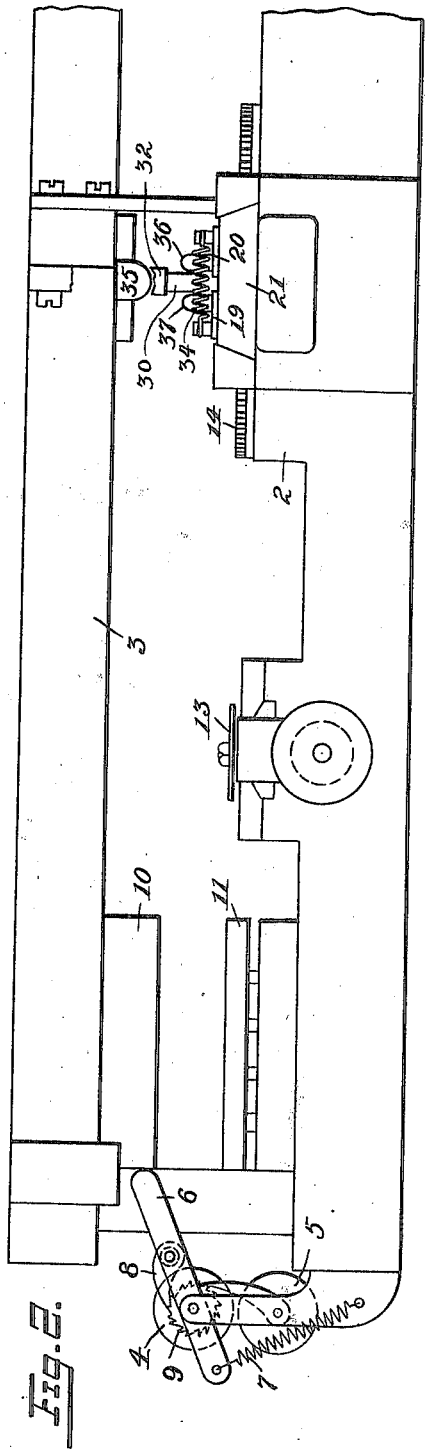
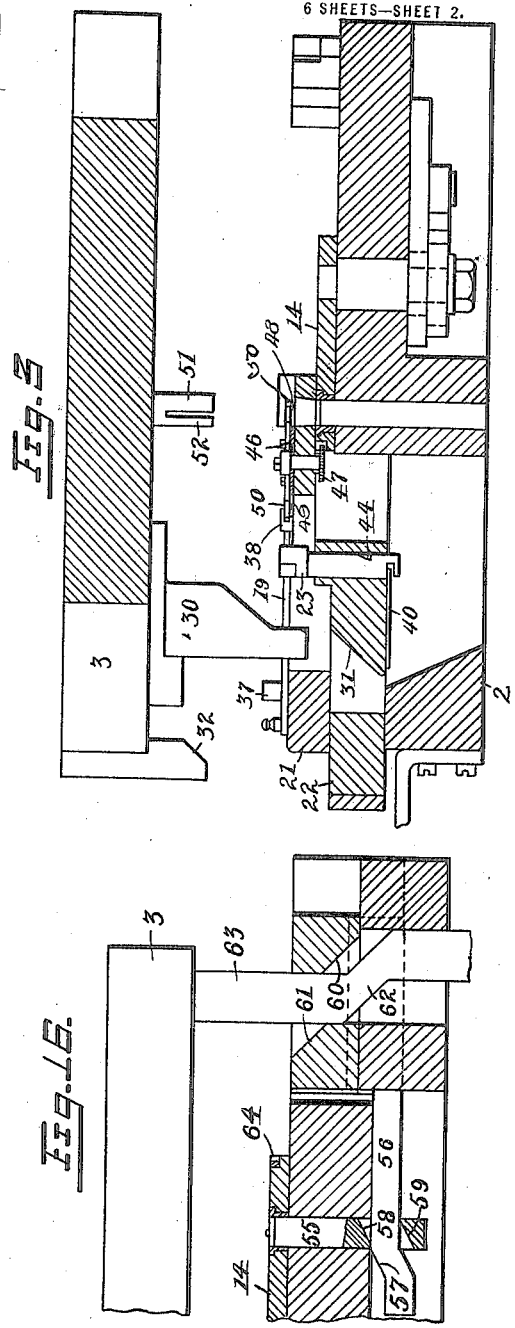

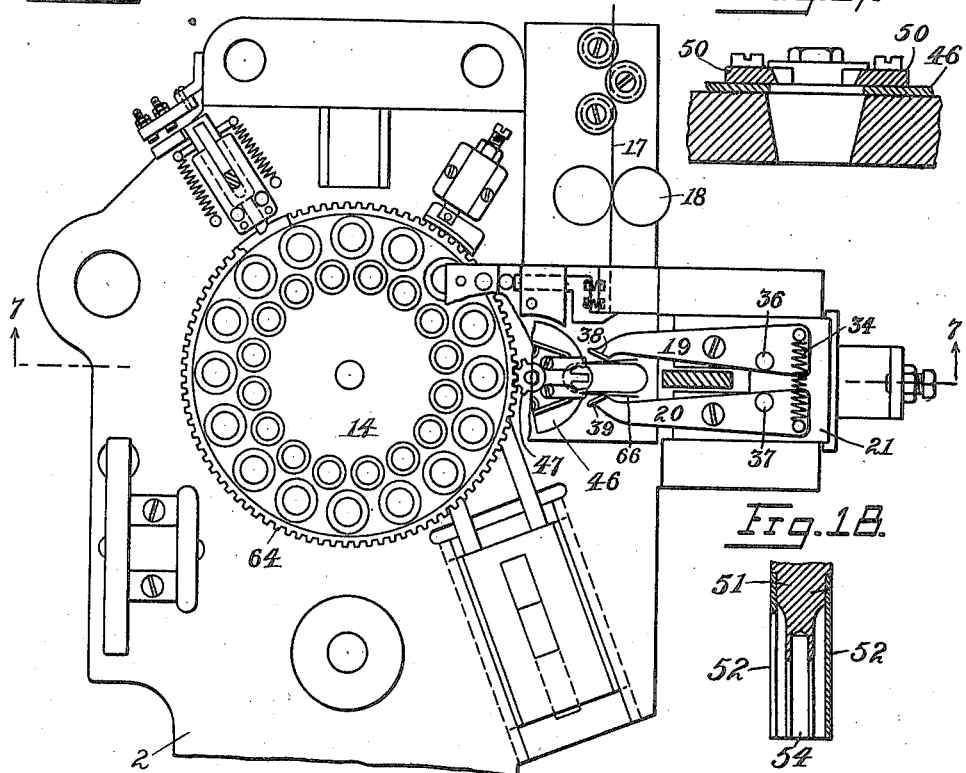
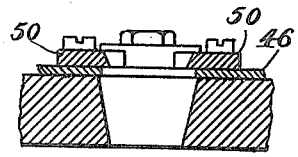
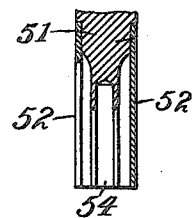
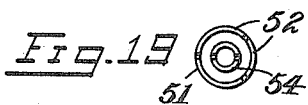
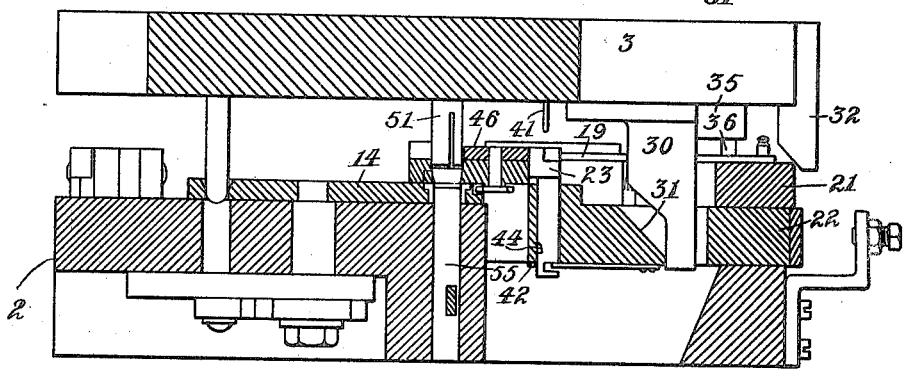

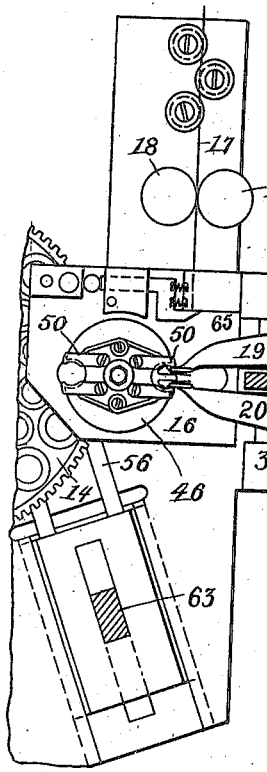
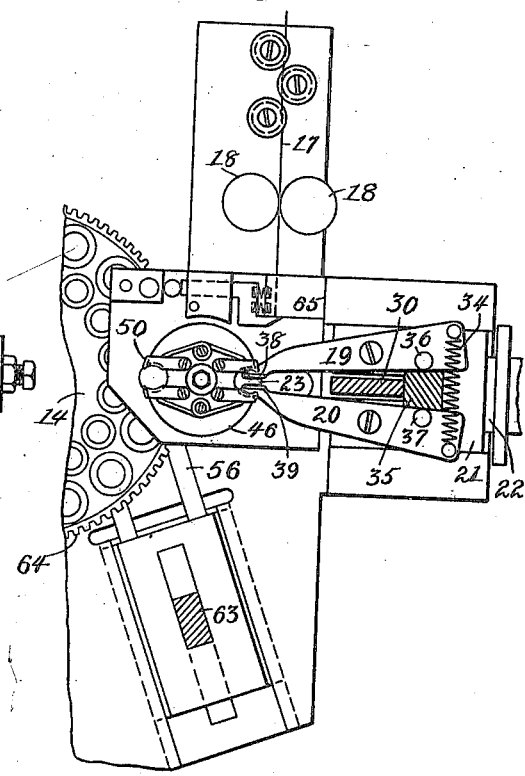
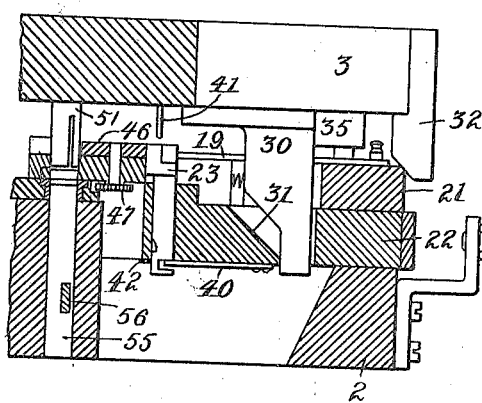
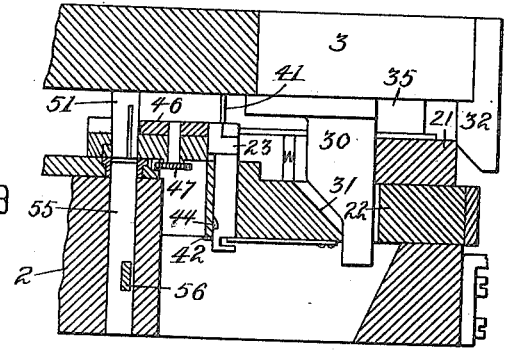

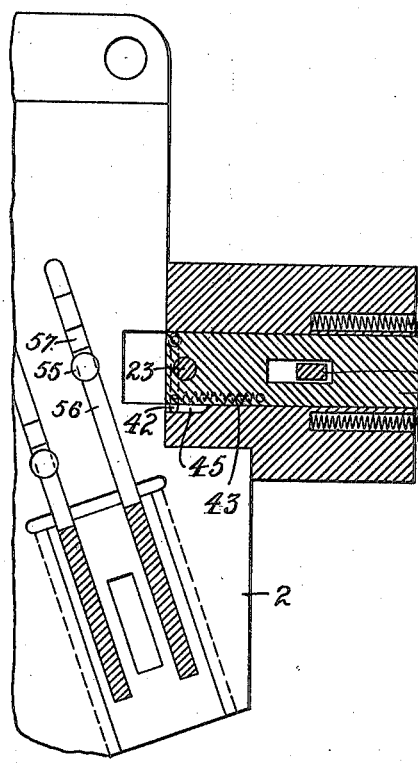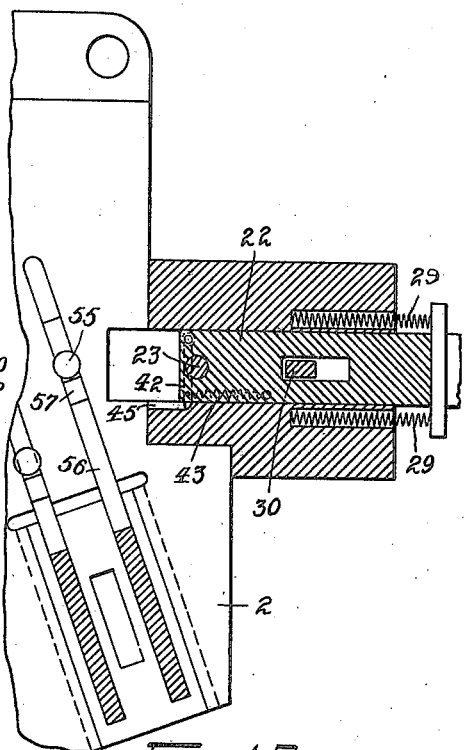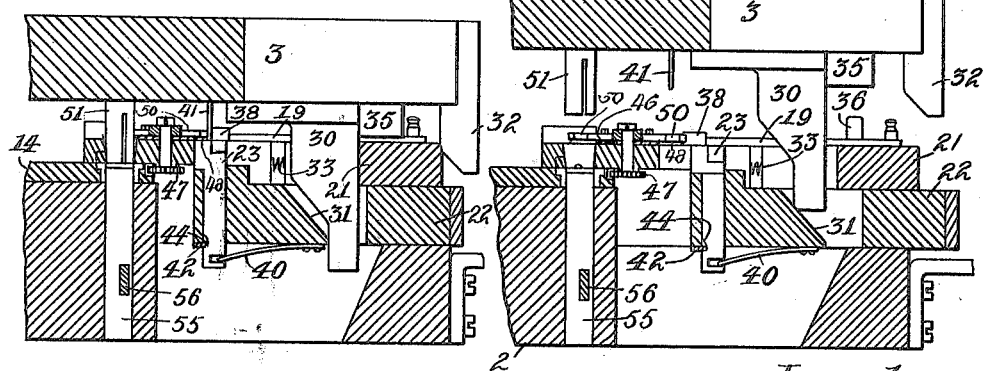

Patented Oct. 24, 1922.

1,433,244

UNITED STATES PATENT OFFICE.

OSCAR SODERSTROM, OF NEW YORK, N. Y., AND WARREN FUHRMANN, OF WESTFIELD, NEW JERSEY.

BUTTON MACHINE.

Application filed May 1, 1918. Serial No. 231,816.

*To all whom it may concern:*

Be it known that we, OSCAR SODERSTROM, a citizen of the United States, and a resident of New York city, county of Bronx, and State of New York, and WARREN FUHRMANN, a citizen of the United States, and a resident of Westfield, county of Union, and State of New Jersey, have invented certain new and useful Improvements in Button Machines, as set forth herein.

This invention relates to an organized machine designed for the purpose of producing a completed snap fastener socket member, in which the machine is supplied with a sheet metal strip and with spring wire, and the machine will automatically cut and shape the button from the strip, and will form the desired shape of spring from the wire, and will thereupon assemble the formed spring in the blank and secure it therein.

The principal object of the invention is to provide improved means for forming the special shape of spring from the wire; and also means for inserting the spring in the blank to engage the slotted head.

Figure 4:
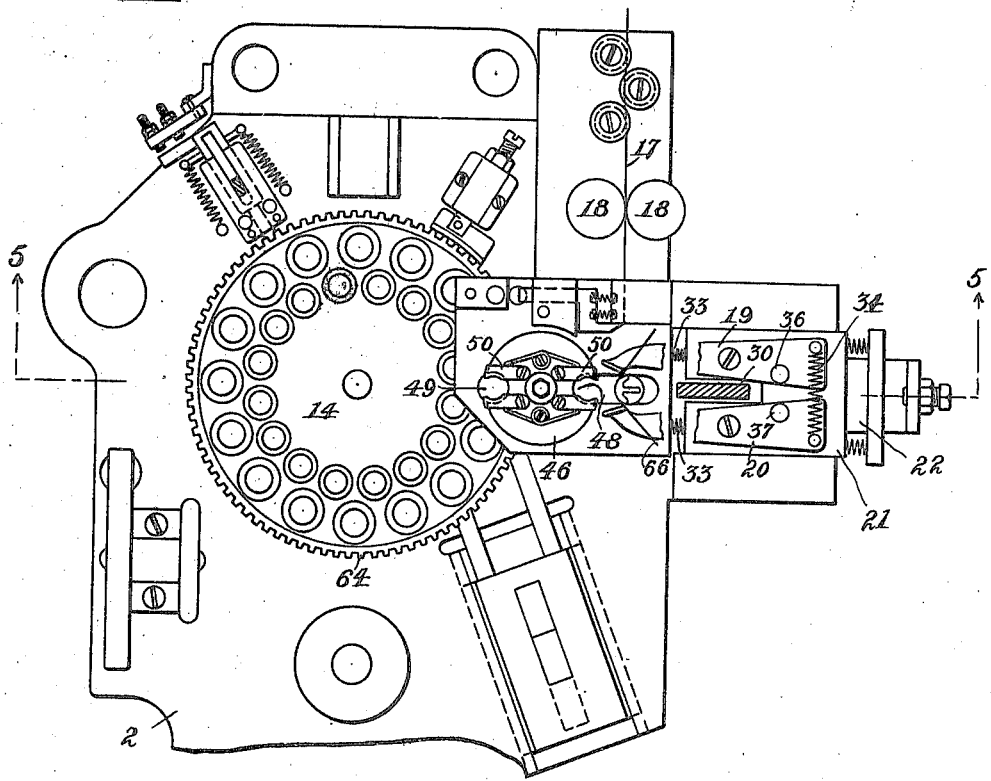
Figure 5:
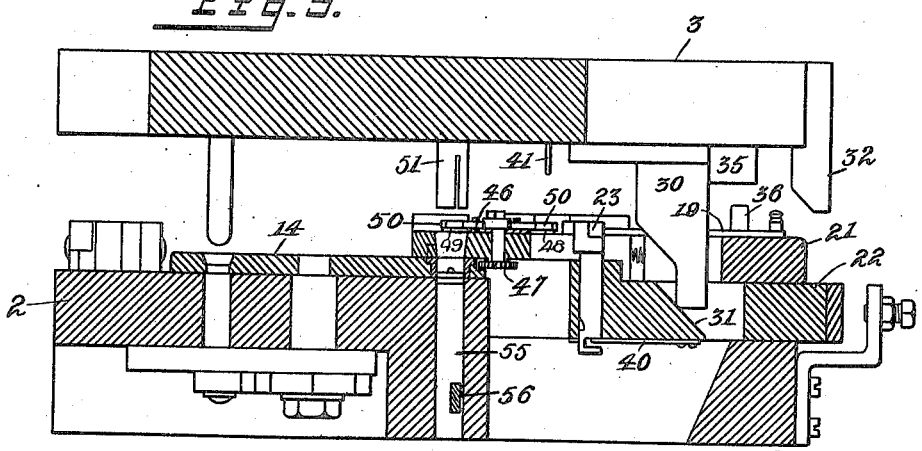

In the accompanying drawings showing embodiments of our invention Figure 1 is a plan of the machine. Fig. 2 is a rear elevation of the machine. Fig. 3 is a vertical section on the line 3—3 of Fig. 1. Fig. 4 is a partial plan view indicating the first bending operation of the wire. Fig. 5 is a cross section on the line 5—5 of Fig. 4. Fig. 6 is a partial plan with the bending means further advanced. Fig. 7 is a vertical section on the line 7—7 of Fig. 6. Fig. 8 shows the spring forming means still further advanced; and Fig. 9 is a vertical section through Fig. 8. Fig. 10 is an inner view of the wire bending parts fully advanced; and Fig. 11 is a transverse vertical section through Fig. 10. Fig. 12 is a partial horizontal section of certain parts shown in Fig. 3. Fig. 13 is a vertical transverse section of the parts shown in Fig. 12. Fig. 14 is a view similar to Fig. 12 with the parts advanced; and Fig. 15 is a vertical transverse section through the parts of Fig. 14. Fig. 16 is a section on line 16—16 of Fig. 1. Fig. 17 is a vertical section of the carrier. Figs. 18 and 19 show the bar for inserting the formed spring. Fig. 20 shows the first bend given to the spring wire. Fig. 21 shows the second bend. Fig. 22 shows the subsequent bend. Fig. 23 shows the final bending of the wire spring, and Fig. 24 shows the former in plan.

As shown in Figs. 1 and 2 the machine comprises a bed 2 and plunger 3. A strip of sheet metal is supplied to the machine and fed by suitable advancing means such as rolls 4 and 5, intermittently rotated by a lever 6 that is swung by the plunger and a spring 7, to cause a pawl 8 to engage a ratchet wheel 9 and roller 4 to turn the rolls and advance the strip at each elevation of the plunger, since the various subsequent operations on the strip are performed when the plunger descends.

The strip is first acted on by suitable forming dies located at 10 and 11, on the plunger and bed respectively, whereby heads are formed in the blank by bending up the metal, by the usual die mechanism. As the strip is advanced the heads are engaged by saws 12 and 13 that operate to form slots on opposite sides of the head adjacent the base or strip. The construction and operation of these devices forms no part of the present application and need not be further described.

The strip with the formed and slotted heads is advanced by the feed rolls to pass over a table denoted generally by 14. This table is intermittently rotated step by step from suitable indexing means not shown, once for each descent of the plunger and advance of the strip. A series of pockets 15 is provided in a circle on the table, and the strip with the slotted head is brought above the pocket $15^x$, and by suitable means a circular button blank, containing the slotted head, is severed from the strip and forced into such pocket. It will be understood that as the pockets 15 are successively brought to register with the strip, the strip is advanced the distance apart of the heads.

As the table is swung around, the blank in the pockets is brought adjacent the wire spring bending means, located at 16, see Fig. 1. The wire spring for the button is bent into the shape shown in Fig. 23, from a single straight length of wire 66, as indicated in Figs. 20–22. The wire 17 is advanced by suitable means, such as rolls 18, 18, and is fed across a pair of arms 19, 20, (Figs. 6–7) pivoted at their middle portion on a block 21. This block is movable to and from the table on the base. A slide 22 moves to and from the table below block 21, and carries a former 23 in a vertical bore therein. The top portion of the former is shaped as indicated in Fig. 24, having a front curved face 24, and a rearwardly extending tongue 25, at the base of which are sockets 26 and 27. This has somewhat the contour of the finished spring 28 shown in Fig. 23.

The slide 22 is normally pressed rearward by springs 29—29, (Fig. 12), and is advanced by a block 30 fast on the plunger 3 (Fig. 5), that engages a cam face 31 of an opening in the slide, to advance the slide from this position to that indicated in Fig. 7. The slide 21 is engaged by a cam piece 32 on the plunger to move it forward, and is moved back by springs 33. The arms 19 and 20 are held in the position shown by a coil spring 34, and at the latter part of the descent of the plunger, a tapered piece 35 on the plunger will engage pins 36 and 37 on the arms to separate the rear ends and cause approach of the forward ends of the arms, as indicated in Fig. 8. The former 23 is normally held to extend above the slide 21 and between the extremities of the arms 19 and 20, that carry ears 38 and 39, by a plate spring 40 (Fig. 5) that permits depression of the former by a pin 41 on the plunger 3 at the latter part of its descent, as shown in Fig. 13. Means are also provided to retain the former in depressed position for a certain period, shown as comprising a pivoted arm 42 (Fig. 14) that is drawn by a coil spring 43 against the former 23 so that when the former is depressed the arm will engage a notch 44 in the former and retain the former depressed. (Fig. 13). This is done when the slide 22 has been advanced; and when the slide is returned to normal position, the end wall of a slot 45 in the base will engage the end of the arm 42 and draw it away from the notch 44 in the former; whereby the spring 40 will raise the former to its normal position.

Between the table 14 and the former 23 is located a spring carrier, shown in the form of a rotatable disc 46, carrying a pinion 47 meshing with the toothed edge 64 of the table. These parts are so designed that when the table is advanced to bring the next pocket 15 into position for operation, the disc will turn a half revolution. The disc has two recesses 48, 49, therein diametrically opposite, and after each advance of the table, one of these recesses will register with a pocket 15 below it on the table, see Fig. 4. These pockets aline with the movement of the slides, and the one remote from the table is normally opposite the former 23, and adapted to have the former advanced therein by the slide 22. The former and the arms with their ears, serve to bend the wire length 66 to make the finished spring 28, and force it into the recess in the carrier. The carrier then makes a half revolution to bring the spring above the pocket in the table, while the other recess is brought to receive the next spring. At each of these recesses in the carrier are a pair of spring-pressed arms or jaws 50, located on top of the disc to slightly overhang the top side edges of the recesses 48, 49, so that the sides of the spring will enter opposed pockets in the cavity. But when it is desired to force the spring down into the table pockets these arms or jaws yield and permit engagement by a plunger member with the spring as shown in Fig. 17, the inner edges of the jaws are beveled so as to permit entry of the spring discharging arms 52 described below. Referring now particularly to Figs. 5, 7, 18 and 19, the means for engaging the finished spring, and pushing it out of the recess in the carrier, comprises a downwardly projecting stud 51, carried by the plunger 3. on which is mounted a cylindrical sleeve which is provided with a number of vertical slots, here shown as three in number, to thereby form annular resilient arms 52.

The inner part of the stud is reduced, as shown in Fig. 18, and is hollow and slotted to thereby form a pair of annular resilient arms 54. As the plunger 3 moves downwardly, the outer annular arms 52 will engage the outer portion of the finished spring, while the inner annular arms 54 will engage the central portion of the spring to carry the whole spring bodily into the cup. This cup is provided with a hollow central head, slotted at each side as is usual; the inner arms 54 push the opposed center portions of the spring over the hollow head so that these portions will snap into the slots in the side of the head.

The button blank is severed from the strip at the location 15×, and when the pocket 15 in the table is brought around under the carrier, the button blank is slightly lifted to receive the spring 28 inserted by the bar 51. As shown in Fig. 16, we provide a plunger 55 in the table at this location that will register with the pocket 15 and with the cavity in the carrier. To reciprocate the plunger 55 we provide a slide 56 movable in the base to have its inclined portion 57 engage the inclined faces 58 and 59 of a slot in the plunger 55. The slide 56 has an opening with inclined faces 60 and 61 that engage an inclined portion 62 of a bar 63 carried by the plunger 3. When the plunger 3 descends, this bar will advance the slide 56 and serve to elevate the plunger 55, at the latter portion of the descent of the plunger 3. This will serve to force the button blank up in the pocket 15 to receive the spring 28, that will be forced down by the bar 51 having the concentric spring arms.

In the operation of this machine by the mechanism as set forth, it will be understood that a thin strip of deformable sheet metal is fed into the machine by the rollers 4 and 5, that a head is produced by suitable dies in the strip, one for each intermittent advance, and that the saws serve to cut slots in the opposite sides of the head near its base. The strip is then further advanced to the table, and a button blank of a cupped form is shaped and severed from the strip, and inserted in the pocket 15×. As the table 14 is intermittently swung, the button blank will be brought around under one of the cavities in the carrier 46. The formed spring 28 is at this place inserted in the cupped blank, and further advance of the table and pockets causes the button blank to pass along and be engaged by finishing dies, not herein set forth, whereby the edge of the cupped blank is rolled over or beaded to retain the spring in the blank.

The wire 17 is advanced by the rolls 18 to have a length 66 passed across the slides and arms, in front of the former 23 adjacent the rounded portion 24, and back of the ears 38 and 39 on the arms 19 and 20. By suitable means not shown, the wire is severed at the place 65, leaving a length 66 sufficient to make the finished spring 28 by the bending operation. The slide 22 is first advanced, and the face 24 of the former will engage the wire blank 66 at its middle portion and advance it between the said ears 38, 39, as indicated in Fig. 4; that will assume the shape shown in Fig. 20. This position of the bending parts is indicated in Figs. 4 and 5. Further advance of the slide and former will result in the latter forcing the wire length at its rounded portion into the cavity 48 in the carrier (Figs. 6—7). The slide and former remain in this position at this stage and the continued descent of the plunger 3 will swing the arms 19 and 20, and cause approach of the ears 38 and 39 of the arms, that will bend inwardly the end portions of the blank beyond the rounded portion, against the tongue 25 of the former, as indicated in Figs. 8 and 9. The wire length will now assume the form shown in Fig. 22. The next operation is to cause the advance bodily of the arms 19 and 20, whereby the ears 38 and 39, that now engage the wire blank at the portions 67 and 68 (Fig. 22), will move into the socket portions 26 and 27 of the former (Fig. 10), and bend the wire blank to the form shown in Fig. 23. At this stage the continued descent of the plunger will cause the pin 41 thereon to engage the former 23 and depress the former, and cause it to latch by the arm 42 (Fig. 13). As soon as the plunger starts to rise, the swinging arms with the ears 38 and 39 are retracted, before the tapered piece 35 releases the arms to separate, and this will leave the formed spring 28 in the carrier cavity.

The continued ascent of the plunger 3 will result in the advance of the table, and rotation of the carrier, that will bring the spring blank 28 in the cavity, around to the position adjacent the table. It will be understood that the spring arms 50 will hold the formed spring in the carrier during this travel. This will bring the other recess in the carrier around adjacent the former to have another wire length bent and placed therein at the next descent of the plunger. While this operation is taking place, the moving down of the plunger 3 will result in the pushing bar 51 with its concentric split end portions entering the cavity and serving to spread the spring-pressed arms or jaws 50, and forcing the spring 28 down through the carrier recess and into a cupped blank in the pocket 15 now registering therewith. It will be understood that at each descent of the plunger, a wire length is bent and placed in the forward recess of the carrier while the previously formed wire spring is forced down from the opposite recess into the button blank.

What we claim is:—

1. A combination of a carrier having a recess in one side, a former having one edge rounded with the opposite edge projecting rearward to form a tongue and a socket in the former on each side of the tongue, a pair of arms one movable at each side of the former, an ear on each arm, means to advance the former to engage a wire length placed between the ears and the former, and to further advance the former into the carrier recess to thereby bend the wire around the rounded edge of the former, means for thereupon swinging the arms to cause the ears to bend the wire length end portions against the sides of the former, and means for thereupon causing advance of the arms to cause the ears to force the wire end portions into the said former sockets adjacent the tongue.

2. A combination of a carrier having a plurality of recesses in the side, a former having one edge rounded with the opposite edge projecting rearward to form a tongue and a socket in the former on each side of the tongue, a pair of arms one movable at each side of the former, an ear on each arm, means to advance the former to engage a wire length placed between the ears and the former, and to further advance the former into one of the carrier recesses to thereby bend the wire around the rounded edge of the former, means for thereupon swinging the arms to cause the ears to bend the wire length end portions against the sides of the former, means for thereupon causing advance of the arms to cause the ears to force the wire end portions into the said sockets adjacent the tongue, means for thereupon causing retraction of the former and arms to leave the formed spring in the carrier recess, and means for shifting the carrier to convey the formed spring away from such position and to bring another recess to the forming position.

3. A combination of a carrier having a plurality of recesses in the side, a former having one edge rounded with the opposite edge projecting rearward to form a tongue and a socket in the former on each side of the tongue, a pair of arms one movable at each side of the former, an ear on each arm, means to advance the former to engage a wire length placed between the ears and the former, and to further advance the former into one of the carrier recesses to thereby bend the wire around the rounded edge of the former, means for thereupon swinging the arms to cause the ears to bend the wire length end portions against the sides of the former, means for thereupon causing advance of the arms to cause the ears to force the wire end portions into the said sockets adjacent the tongue, means for thereupon causing retraction of the former and arms to leave the formed spring in the carrier recess, means for shifting the carrier to convey the formed spring away from such position and to bring another recess to the forming position, a table arranged to bring button blanks adjacent the carrier to receive the formed spring therein that is brought above the blank as the carrier is advanced to bring another recess to the spring-forming position, and means for shifting the formed spring from the carrier into the blank in the table while the said spring-forming operation is being effected at another recess in the former.

4. The combination of a carrier having recesses in the sides, means for swinging the carrier, spring forming means arranged to form a coiled fastener spring of the character set forth and place the spring in one of the carrier recesses, a table arranged to bring cupped button blanks adjacent the carrier to receive the formed spring therein that is brought above the blank as the carrier is advanced to bring another recess to the spring forming position, and means for shifting the formed spring from the carrier into the blank in the table while the said spring forming operation is being effected at another recess in the carrier.

5. The combination with a bed of a member having a cavity at one side, a plunger arranged to reciprocate to and from the bed, a slide movable on the machine and having a bore therein, a former arranged to reciprocate in the bore, a spring to hold the former normally elevated, a pin on the plunger arranged to depress the former when the plunger descends, a spring lever arranged to hold the former in lowered position and to release the former on retraction of the slide to normal position, the former having at the top a round front edge with the rear projecting to form a tongue and also a socket in the rear face on each side of the tongue, a slide block slidable in the base, a pair of arms pivoted on the block and each provided with an ear on the front end, a cam block on the plunger arranged to engage the slide on descent of the plunger to advance the former between said ears and into the said member cavity, whereby to bend a wire length placed between the ears and the former and force it into said member cavity, a piece on the plunger arranged to engage and swing said arms to bring the ears to bend the wire end portions against the said former tongue, a cam piece on the plunger arranged to engage said slide block to advance the slide block and arms after said advance of the slide and former to cause the ears to force the wire end portions into the said sockets in the former, said pin on the plunger thereupon engaging the former to depress it and leave the formed spring in the member cavity, means for retracting the slide block on ascent of the plunger to withdraw and release said arms, and means for later retracting the slide to return the former to normal position, and means for releasing the spring lever from the former to permit the former to rise to normal position.

6. The combination with a bed, of a member having a recess at one side, a plunger arranged to reciprocate to and from the bed, a slide movable on the machine and having a bore therein, a former arranged to reciprocate in the bore, a spring to hold the former normally elevated, a pin on the plunger arranged to depress the former when the plunger descends, the former having at the top a round front edge with the rear projecting to form a tongue and also a socket in the rear face on each side of the tongue, a slide block slidable in the base, a pair of arms pivoted on the slide block and each provided with an ear on the front end, a cam block on the plunger arranged to engage the slide on descent of the plunger to advance the former between said ears and into the said member recess, whereby to bend a wire length placed between the ears and the former and force it into said member recess, a piece on the plunger arranged to engage and swing said arms to bring the ears to bend the wire end portions against the said former tongue, a cam piece on the plunger arranged to engage said slide block to advance the slide block and arms after said advance of the slide and former to cause the ears to force the wire end portions into the said sockets in the former, said pin on the plunger thereupon engaging the former to depress it and leave the formed spring in the member recess, means for retracting the slide block on ascent of the plunger to withdraw and release said arms, and means for later retracting the slide to return the former to normal position.

7. In a button machine, the combination with means for holding and supporting a cupped button blank, and means for holding a coiled wire spring substantially as set forth, of a device for inserting the spring in the blank, comprising a bar having an annular set of spring arms arranged to engage the outer portion of the spring, and also provided with an inner set of spring arms offset from said arms and adapted to engage the inner part of the spring to force it over a raised head at the center of the button blank.

8. The combination with a bed, of a member having a cavity at one side, a plunger arranged to reciprocate to and from the bed, a slide movable on the machine, a former on the slide, the former having at the top a rounded front edge with the rear projecting to form a tongue and also a socket in the rear face on each side of the tongue, a slide block slidable in the base, a pair of arms pivoted on the slide block and each provided with an ear on the front end, a cam block on the plunger arranged to engage the slide on descent of the plunger to advance the former between said ears and into the said member recess, whereby to bend a wire length placed between the ears and the former and force it into said member recess, a piece on the plunger arranged to engage and swing said arms to bring the ears to bend the wire end portions against the said former tongue, a cam piece on the plunger arranged to engage said slide block to advance the slide block and arms after said advance of the slide and former to cause the ears to force the wire end portions into the said sockets in the former, means for retracting the slide block on ascent of the plunger to withdraw and release said arms, and means for later retracting the slide to return the former to normal position.

9. In a machine for inserting springs in cupped blanks, the springs each being provided with an outer circumferential portion, and a pair of opposed resilient inner portions, the cupped blanks being each provided with a hollow central head slotted on each side, the combination of a carrier for the blanks, a plunger comprising outer annular arms for engaging the outer portion of the spring, and forcing it into the cupped blank, and inner annular arms, spaced from the outer arms for engaging the inner portions of the spring, for forcing such inner portions over the head of the cupped blank into the slots in the side of the head.

10. The combination of a base, a carrier rotatably mounted on the base and comprising a plate having recesses or openings therein, spring arms on the carrier on opposite sides of the recesses, said spring arms overhanging the recesses to form side pockets with the base, spring-forming means arranged to form a coiled fastener spring of the character set forth and place the spring in a carrier recess, a table arranged to bring cupped button blanks adjacent the carrier to receive the formed spring therein, means for swinging the carrier to convey the formed spring in the pocket around from the forming means to a position above the button blank in the table, and means for engaging the spring arms to force the formed spring in the pockets from the carrier down into the blank in the table pocket, while said spring forming operation is being effected at another recess in the carrier.

11. The combination of a base, a carrier rotatably mounted on the base and comprising a plate having recesses or openings therein, spring arms on the carrier on opposite sides of the recesses, said spring arms overhanging the recesses to form side pockets with the base, spring-forming means arranged to form a coiled fastener spring of the character set forth and place the spring in a carrier recess, a table arranged to bring cupped button blanks adjacent the carrier to receive the formed spring therein, means for swinging the carrier to convey the formed spring in the pocket around from the forming means to a position above the button blank in the table, and means for engaging the spring arms to force the formed spring in the pockets from the carrier down into the blank in the table pocket, while said spring forming operation is being effected at another recess in the carrier, said means comprising a bar having resilient annular arms adapted to spread the said spring arms and force the spring down into the recess to enter the button blank.

12. In a machine for making snap fasteners, the combination of a spring carrier provided with a recess for carrying a spring from a spring forming position to a spring discharging position, a former which engages the central part of a length of wire to push it into the recess of the spring carrier, to thereby preliminarily bend the wire about the former, and means cooperating with the length of wire and the former for engaging the ends of the wire during the preliminary bending operation and for completing the bending of the wire about the former while the former is in the recess of the spring carrier.

13. In a machine for making snap fasteners, the combination of a spring carrier provided with a recess, for carrying a spring from a spring forming position to a spring discharging position a former which engages the central part of a length of wire to push it into the recess of the spring carrier, to thereby preliminarily bend the wire about the former, means cooperating with the length of wire and the former for engaging the ends of the wire during the preliminary bending operation and for completing the bending of the wire about the former while the former is in the recess of the spring carrier, and means for moving the former transversely out of the recess in the spring carrier after the bending of the wire about the former has been completed.

14. In a machine for making snap fasteners, the combination of a pair of arms, a former positioned between the arms, a spring carrier provided with a recess for carrying a finished spring to a spring discharging position, means for feeding a length of wire in front of the former, means for advancing the former so that it engages the central part of the wire and pushes it into the spring carrier while the ends of the wire engage the arms, means for moving the arms toward each other and then toward the former in the recess to complete the bending of the wire about the former and means for operating the carrier.

15. In a machine for making snap fasteners, the combination of a pair of arms, a former positioned between the arms, a spring carrier provided with a recess for carrying a finished spring to a spring discharging position, means for feeding a length of wire in front of the former, means for advancing the former so that it engages the wire and carries it into the spring carrier, and means for operating the arms for completing the bending of the wire about the former and means for operating the carrier.

16. In a machine for making snap fasteners, the combination of a pair of arms each provided with a wire engaging ear, a former positioned between the arms and to one side of a line through the ears, means for feeding a length of wire in front of the former, between the ears and the former, a spring carrier provided with a recess, for carrying the finished spring to a spring discharging position, means for advancing the former so that it engages the central part of the wire and carries it into the recess in the spring carrier, while the ends of the wire are engaged by the ears, and means for operating the arms for completing the bending of the wire about the former.

17. In a machine for making snap fasteners, the combination of a pair of wire engaging arms, a former positioned between the arms, means for feeding a length of wire in front of the former, a spring carrier provided with a recess for carrying the finished spring to a spring discharging position, means for moving the former so that it engages the wire and pushes it into the recess in the carrier, means for operating the arms for completing the bending of the wire about the former, and means for moving the former out of the recess in the spring carrier in a direction transverse to its first movement.

18. In a machine for making snap fasteners, the combination of a pair of wire engaging arms, a former means for feeding a length of wire in front of the former, a spring carrier provided with a recess for carrying the finished spring to a spring discharging position, means for moving the former to engage the wire and push it into the recess in the carrier, means for operating the arms to complete the bending of the wire about the former, means for moving the former out of the recess in the carrier in a direction transverse to its first movement, and means for returning the former to its original position.

19. Mechanism for forming springs for snap fasteners, comprising wire engaging arms, a former between the arms, means for feeding a length of wire in front of the former, a spring carrier, means for moving the former forwardly to engage the wire and push it into the carrier, then laterally out of the carrier, then backwardly and laterally to its original position.

20. Mechanism for forming springs for snap fasteners, comprising wire engaging arms, a former between the arms, means for feeding a length of wire in front of the former, a spring carrier, means for moving the former forwardly to engage the wire and push it into the spring carrier, means for operating the arms to complete the bending of the wire about the former, means for moving the former laterally out of the carrier, means for latching the former in such position, means for moving the former backwardly and means for unlatching the former and returning it to its original position.

21. In a machine for making snap fasteners, the combination of a rotatable carrier provided with resiliently mounted spring receiving jaws, a former for engaging a length of wire and pushing it between the resiliently mounted jaws, and wire bending arms cooperating with the former to complete the bending of the wire about the former.

22. In a machine for making snap fasteners, the combination of a rotatable carrier provided with a recess having a resilient jaw, a former for engaging a length of wire and pushing it into the recess, wire bending arms cooperating with the former to complete the bending of the wire about the former, and means for moving the former transversely out of the recess, after the wire bending operation has been completed.

23. In a machine for making snap fasteners, the combination of a cup carrying table, a rotatable spring carrier provided with two recesses, an edge of each recess being formed by a resilient jaw, means for forming a spring and leaving it in one recess, simultaneously operated means for transferring a completed spring from the other recess to a cup in the cup carrying table, and means for rotating the spring carrier so as to reverse the positions of the two recesses after the spring forming and spring transferring operations have been completed.

24. In a machine for making snap fasteners, the combination of a rotating carrier provided with a spring receiving recess, a pair of wire engaging arms, a former between the arms adapted to push a length of wire into the recess in the carrier, means for operating the arms to complete the bending of the wire about the former, and means for moving the former transversely out of the carrier.

25. In a machine for making snap fasteners, the combination of a rotating carrier provided with two recesses, a former to push a length of wire into one of the recesses, arms cooperating with the former to complete the bending of the wire about the former, means for moving the former transversely out of the carrier, and means for moving the carrier, after the wire bending operation is completed, to carry the finished spring to a spring inserting position and to bring the other recess into the path of the former.

26. In a machine for making snap fasteners, the combination of a rotatable cup carrying table, a rotatable spring carrier geared to the table, provided with spring receiving recesses, means for forming a spring and leaving it in one of the recesses, and simultaneously operated means for transferring a finished spring from another of said recesses to a cup carried by the table.

27. In a machine for making snap fasteners, the combination of a rotatable cup carrying table, a rotatable spring carrier provided with two spring receiving recesses, a former for pushing a length of wire into one of the spring receiving recesses, arms cooperating with the former to complete the bending of the wire about the former, means for transferring a finished spring from the other of said recesses to a cup carried by the table, the spring carrier being adapted to rotate 180° after the spring forming and spring transferring operations are completed.

28. In a machine for making snap fasteners, the combination of a cup carrying table, a rotatable spring carrier provided with two spring receiving recesses, means for forming a spring and leaving it in one of the recesses, simultaneously operated means for transferring a finished spring from the other recess to a cup located in the cup carrying table, and means for rotating the spring carrier so as to reverse the positions of the two recesses, after the spring forming and spring transferring operations have been completed.

29. In a machine for making snap fasteners, the combination of a cup carrying table, a rotatable spring carrier provided with two recesses, means for forming a spring and leaving it in one recess, means for transferring a finished spring from the other recess to a cup carried by the cup carrying table, and means for lifting the cup to which the spring is being transferred, toward the spring.

30. In a machine for making snap fasteners, a spring carrier, a former for pushing a length of wire into the carrier, a pair of arms for engaging the wire for bending it toward the former, and for pushing it into sockets in the former, and a reciprocating plunger for causing said movement of the former and arms.

31. In a machine for making snap fasteners, a spring carrier for carrying a finished spring from a forming position to a discharging position, a former for pushing a length of wire into engagement with the carrier, a pair of arms for bending the wire around the former and for pushing it into sockets on the former to form a spring, means for moving the carrier, and a reciprocating plunger for actuating the former and the arms and for moving the former transversely out of engagement with the spring carrier.

32. In a machine for making snap fasteners, a cup carrier, a spring carrier provided with two recesses, means for moving the carrier to interchange the positions of the two recesses, a former and cooperating arms for forming a spring in one recess, and a reciprocating plunger which operates the former and its cooperating arms and which carries means for transferring a finished spring from the second recess to a cup in the cup carrier.

33. In a machine for making snap fasteners, the combination of the cup carrier, a rotatable spring carrier provided with two spring receiving recesses located about 180° apart, a former and cooperating arms for forming a spring from a length of wire, a reciprocating plunger for moving the former into engagement with one of the spring receiving recesses, provided with means for transferring a finished spring from the other recess into a cup in the cup carrier, and means for rotating the spring carrier 180° after the spring forming and spring transferring operations have been completed.

34. In a machine for making snap fasteners, a cup carrier, a spring carrier provided with two recesses, a former, means cooperating with the former for forming a spring in one recess, a reciprocating plunger for operating the spring forming means, means carried by the plunger for pushing out a finished spring from the other recess into a cup, means operated by the plunger for tilting the cup from the cup carrier toward the finished spring that is being inserted therein, and means for moving the carrier for reversing the positions of the two recesses.

35. In a machine for making snap fasteners, a former provided with sockets, a pair of wire bending arms relatively movable with respect to the former and toward it for preliminarily bending the wire about the former, the arms and former being relatively movable in the opposite direction, to push the wire into the sockets on the former, and means for operating the arms.

36. In a machine for making snap fasteners, a pair of wire bending arms each provided with a wire engaging ear, a former provided with sockets, located between the arms, means for feeding a length of wire across the arms, means for relatively moving the former and arms for engaging the wire with said ears in order to preliminarily bend the wire about the former, and means for again relatively moving the former and wire bending arms, and in a direction opposite to the first movement, so that the said ears push the wire into the sockets on the former to complete the bending operation.

37. In a machine for making snap fasteners, a pair of wire bending arms each provided with a wire engaging ear, a former provided with sockets, located between the arms, means for feeding a length of wire across the arms, means for relatively moving the former and arms for engaging the wire with said ears for preliminarily bending the wire about the former, means for moving the arms toward each other to continue the bending of the wire, and means for again relatively moving the former and wire bending arms in a direction opposite to the first movement, so that the said ears push the wire into the sockets on the former to complete the bending operation.

38. The method of forming and transferring a spring for a snap fastener, comprising feeding a length of wire in front of a former, then advancing the former to partially bend the wire around it, and to push the wire into a recess in a spring carrier, completing the bending of the wire about the former to make a spring while the former is in the recess of the spring carrier, and transferring the spring to a spring discharging position by moving the carrier.

39. The method of forming a spring for a snap fastener, comprising feeding a length of wire in front of a former, advancing the former to partially bend the wire around it, and to push the wire into a recess in a spring carrier, completing the bending of the wire about the former to make a spring while the former is in the recess in the spring carrier, moving the former transversely out of the carrier after the bending operations have been completed, and transferring the spring to a spring discharging position by moving the carrier.

40. The method of forming and transferring a spring for a snap fastener, comprising feeding a length of wire in front of a former, moving the former laterally toward a recessed spring carrier so that it engages the wire and pushes it into a recess in the spring carrier, completing the bending of the wire about the former to make a spring while it is in the recess in the spring carrier, and transferring the finished spring to a discharging position by moving the carrier.

41. The method of forming and transferring a spring for a snap fastener, comprising feeding a length of wire in front of a former, moving the former laterally toward a recessed spring carrier so that it engages the wire and pushes it into a recess in the spring carrier, completing the bending of the wire about the former to make a spring while it is in the recess in the spring carrier, then moving the former transversely out of the carrier.

42. The method of forming a spring for a snap fastener, comprising feeding a length of wire in front of a former, causing relative movement in one direction between the former and a pair of arms to preliminarily bend the wire about the former and causing relative movement in another direction between the former and the arms to complete the bending of the wire about the former to make a finished spring.

43. In a machine for making snap fasteners, a pair of wire bending arms, a former provided with sockets, means for feeding a length of wire in front of the former, means for relatively moving the former and arms so that the wire engages with the arms to preliminarily bend it around the former and means for relatively moving the former and the arms in another direction to push the wire into the sockets on the former for completing the bending of the wire.

44. In a machine for making snap fasteners, a pair of wire bending arms, a former, means for feeding a length of wire in front of the former, means for relatively moving the former and the arms to preliminarily bend the wire about the former, means for moving the arms toward each other to still further bend the wire, and means for relatively moving the former and arms in another direction for completing the bending operation.

45. In a machine for making snap fasteners, the combination of a cup carrier, a rotatable spring carrier provided with two spring receiving recesses located about 180° apart, a former and cooperating arms for forming a spring, means for relatively moving the spring carrier and the former so that the former delivers a spring into one of the spring receiving recesses, means for transferring a finished spring from the other recess to a cup in the cup carrier, and means for rotating the spring carrier 180° after the spring forming and spring transferring operations have been completed.

46. In a machine for making snap fasteners, a cup carrier, a spring carrier provided with a plurality of spring receiving recesses, means for moving the spring carrier so that the springs carried thereby are moved to a spring discharging position over the cup carrier, a former, means for bending a length of wire about the former to make a spring, and a reciprocating plunger for operating the said wire bending means and for causing relative movement between the spring carrier and the former so that the former and the spring on it are moved into one of the spring receiving recesses.

47. In a machine for making snap fasteners, the combination of a spring carrier provided with means for receiving a finished spring, for carrying the finished spring from a forming position to a discharging position, a former provided with sockets, a pair of arms for engaging the wire and bending it about the former and pushing it into the sockets on the former, and a reciprocating plunger for causing relative movement between the spring carrier and the former to bring them into engagement and for then moving the former transversely out of engagement with the carrier.

48. In a machine for making snap fasteners, a cup carrier, a spring carrier provided with a plurality of spring-receiving recesses, means for moving the spring carrier so that the springs are carried to a spring-discharging position, a former and cooperating arms for forming a spring in one of the recesses, a reciprocating plunger for operating the former and the cooperating arms, provided with means for transferring a spring from one of the recesses in the spring carrier to a cup in the cup carrier, and means operated by the plunger for lifting a cup from the cup carrier toward the finished spring that is being inserted therein.

49. In a machine for making snap fasteners, a cup carrier, a spring carrier provided with a plurality of spring receiving recesses, means for moving the spring carrier so that the springs carried thereby are moved to a spring discharging position over the cup carrier, a former, means for bending a length of wire about the former, means for relatively moving the spring carrier and the former so that the former and the spring on it are moved into one of the spring receiving recesses in the spring carrier, means for moving the former transversely out of the carrier, and means for discharging a spring from the spring carrier to a cup in the cup carrier.

50. In a machine for making snap fasteners, the combination of a spring-carrier provided with means for receiving a formed spring and for carrying the spring from a spring-forming position to a discharging position, a former, means for moving the former laterally to carry a spring into the spring-carrier, means for bending the wire about the former and means for moving the former in a direction transverse to its movement into the spring-carrier to carry it out of engagement with the spring-carrier.

51. In a machine for making snap fasteners, a former provided with sockets, a pair of wire bending arms, means for moving the former and said arms relatively in one direction for preliminarily bending the wire about the former and means for moving the former and the said arms in the opposite direction to push the wire into the sockets of the former.

52. In a machine for making snap fasteners, a former provided with a curved surface on one side and a pair of sockets on the other side, a pair of wire-bending arms, means for feeding wire between the curved surface of the former and said arms, means for moving the arms and the former relatively in one direction for bending the wire about the curved surface of the former, means for moving the arms to further bend the wire about the former and means for moving the arms and former relatively in the opposite direction to push the wire into the sockets of the former.

Signed at New York city, N. Y. on April 13th, 1918.

OSCAR SODERSTROM.
WARREN FUHRMANN.